US012469049B1

(12) United States Patent
Doubleday et al.

(10) Patent No.: US 12,469,049 B1
(45) Date of Patent: Nov. 11, 2025

(54) CROSS-VERTICAL DISTRIBUTION OF SPONSORED CONTENT

(71) Applicant: Google LLC, Mountain View, CA (US)

(72) Inventors: Alan G. Doubleday, South Wales (AU); Jordan Bayliss-McCulloch, Beaconsfield (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/291,623

(22) Filed: Mar. 4, 2019

Related U.S. Application Data

(63) Continuation of application No. 14/336,322, filed on Jul. 21, 2014, now abandoned.

(60) Provisional application No. 62/023,000, filed on Jul. 10, 2014.

(51) Int. Cl.
*G06Q 30/0251* (2023.01)

(52) U.S. Cl.
CPC ..... *G06Q 30/0256* (2013.01); *G06Q 30/0259* (2013.01)

(58) Field of Classification Search
CPC ... G06F 16/29; H04L 12/1813; G09B 29/106; G06Q 30/0256; G06Q 30/02; G06Q 30/0261; G01C 21/3617
USPC .......... 455/456.1; 715/855; 701/424
See application file for complete search history.

(56) References Cited

U.S. PATENT DOCUMENTS

| | | | |
|---|---|---|---|
| 7,027,987 B1 | 4/2006 | Franz et al. | |
| 7,576,754 B1 | 8/2009 | Joseph et al. | |
| 7,650,431 B2 | 1/2010 | Wang et al. | |
| 7,835,859 B2 | 11/2010 | Bill | |
| 7,983,949 B1 | 7/2011 | Joseph et al. | |
| 8,117,069 B2 | 2/2012 | Law et al. | |
| 8,510,045 B2 | 8/2013 | Rueben et al. | |
| 8,626,736 B2 | 1/2014 | Ramer et al. | |
| 8,626,789 B2 | 1/2014 | Jayanti et al. | |
| 10,282,154 B2 * | 5/2019 | Walkin | G06F 16/2428 |
| 2007/0010942 A1 * | 1/2007 | Bill | G01C 21/3617 701/424 |
| 2007/0135991 A1 * | 6/2007 | Riise | G06Q 30/02 455/456.1 |
| 2008/0005292 A1 | 1/2008 | Vinberg | |
| 2008/0052151 A1 | 2/2008 | Xie et al. | |

(Continued)

*Primary Examiner* — Saba Dagnew
(74) *Attorney, Agent, or Firm* — DORITY & MANNING P.A.

(57) ABSTRACT

A method implemented on one or more processors includes identifying a user search query that was submitted through a map interface, wherein the user search query identifies a first geographic location, determining a first geographic identifier that is not included in the user search query based on an abstraction of the first geographic location, determining, based on the first geographic identifier, a vertical market that provides services within an area corresponding to the first geographic identifier, determining a search vertical keyword not included in the user search query that identifies the vertical market, constructing a constructed search query comprising at least the first geographic identifier and the search vertical keyword, identifying sponsored content that is responsive to the constructed search query, and providing, in response to the user search query, data that cause presentation of the identified sponsored content in the map interface.

18 Claims, 4 Drawing Sheets

(56) References Cited

U.S. PATENT DOCUMENTS

| | | | |
|---|---|---|---|
| 2009/0006207 A1* | 1/2009 | Datar | G06Q 30/0256 |
| | | | 705/14.54 |
| 2009/0198767 A1* | 8/2009 | Jakobson | G09B 29/106 |
| | | | 709/203 |
| 2009/0254512 A1 | 10/2009 | Broder et al. | |
| 2010/0030646 A1* | 2/2010 | Riise | G06F 16/29 |
| | | | 705/14.58 |
| 2010/0049609 A1* | 2/2010 | Zhao | G06Q 30/0261 |
| | | | 707/E17.014 |
| 2012/0304087 A1* | 11/2012 | Walkin | H04W 4/02 |
| | | | 715/764 |
| 2013/0245932 A1 | 9/2013 | Beaurepaire | |
| 2014/0359537 A1* | 12/2014 | Jackobson | G06Q 30/0261 |
| | | | 715/855 |
| 2016/0012482 A1 | 1/2016 | Doubleday et al. | |

\* cited by examiner

CROSS-VERTICAL DISTRIBUTION OF SPONSORED CONTENT

CROSS-REFERENCE TO RELATED APPLICATIONS

This application is a continuation of and claims priority to U.S. application Ser. No. 14/336,322, filed on Jul. 21, 2014, which claims priority to U.S. Provisional Application Ser. No. 62/023,000, filed on Jul. 10, 2014, the entire contents of which are hereby incorporated by reference in their entirety.

BACKGROUND

The rise of the Internet has facilitated access to information for millions of people. Some website publishers freely publish their content to increase the number of visitors to their respective websites. For example, some news organizations freely provide news coverage to visitors of their respective websites; and some entertainment related websites freely provide entertainment articles and stories to visitors of their respective websites; etc.

To generate revenue, these publishers sell space (e.g. to be populated with sponsored content, for example, advertising) on their websites. For example, in a sponsored content syndication model, advertisers can extend their marketing reach by distributing sponsored content for presentation with publisher resources. The publishers can place content sponsors' text, video or image advertisements on web pages (or other resources) that have content related to the sponsored content to generate revenue.

SUMMARY

Systems, apparatus, computer program products and methods for responding to user queries in a map space are disclosed.

In a first aspect, a method implemented on one or more processors includes identifying a user search query that was submitted through a map interface, wherein the user search query identifies a first geographic location, determining a first geographic identifier that is not included in the user search query based on an abstraction of the first geographic location, determining, based on the first geographic identifier, a vertical market that provides services within an area corresponding to the first geographic identifier, determining a search vertical keyword not included in the user search query that identifies the vertical market, constructing a constructed search query comprising at least the first geographic identifier and the search vertical keyword, identifying sponsored content that is responsive to the constructed search query, and providing, in response to the user search query, data that cause presentation of the identified sponsored content in the map interface.

Various implementations can include some, all, or none of the following features. Identifying a user search query can include identifying a user search query that further identifies a second geographic location, and the method can include determining a second geographic identifier that is not included in the query based on the second geographic location, and constructing a constructed search query can include constructing a constructed search query comprising the second geographic identifier, the method can include determining, based at least in part on the first geographic identifier and the second geographic identifier, that the user search query is a request for a navigational route between the first geographic location and the second geographic location, wherein identifying sponsored content comprises identifying sponsored content that is responsive to the navigational route and the search vertical keyword. Identifying sponsored content can include identifying content sponsored by one or more vertical market service providers, at least one of the vertical market service providers providing service to a first geographic region identified by the first geographic identifier and a second geographic region identified by the second geographic identifier, and identifying sponsored content that is responsive to the constructed search query can include identifying sponsored content for at least one of the vertical market service providers providing service to the first geographic region and to the second geographic region. At least some of the sponsored content can be content sponsored by one or more vertical market service providers, at least one of the vertical market service providers can provides service along the navigational route; and wherein identifying sponsored content that is responsive to the constructed search query comprises identifying sponsored content for at least one of the vertical market service providers providing service along the navigational route. The first geographic identifier can identify a first geographic region and the first geographic location can be a geographic sub-region that includes less than the entire geographic region. The geographic identifier can identify a city within which the first geographic location is located. The search vertical keyword that identifies the vertical market can be selected from the group including: transportation, travel planning, and lodging.

In a second aspect a system includes a map data store that stores map data defining a map, and a map server in communication with the map store. The map server is configured to perform operations including identifying a user search query that was submitted through a map interface and identifies a first geographic location, determining a first geographic identifier based on an abstraction of the first geographic location, determining, based on the first geographic identifier, a vertical market that provides services within an area corresponding to the first geographic identifier, determining search vertical keyword not included in the user search query that identifies the vertical market, constructing a constructed search query comprising at least the first geographic identifier and the search vertical keyword, identifying sponsored content that is responsive to the constructed search query, and providing, in response to the user search query, data that cause presentation of the identified sponsored content in the map interface.

Various implementations can include some, all, or none of the following features. The user search query can identify a second geographic location, the user search query can be a request for a navigational route between the first geographic location and the second geographic location, the constructed search query can include a second geographic identifier determined based on an abstraction of the second geographic location, and the sponsored content is responsive to the navigational route, and wherein the method further comprises determining the second geographic identifier based on the second geographic location. The first geographic identifier can identify a first geographic region and the first geographic location is a geographic sub-region that includes less than the entire geographic region. The first geographic identifier can identify a city within which the first geographic location is located. The search vertical keyword that identifies the vertical market can be selected from the group comprising: transportation, travel planning, and lodging. At least some of the sponsored content can be content sponsored by one or more vertical market service providers, at least one of the vertical market service providers providing service to a first geographic region identified by the first geographic identifier and a second geographic region identified by the second geographic identifier; and wherein identifying sponsored content that is responsive to the constructed search query can include identifying sponsored content for at least one of the vertical market service providers providing service to the first geographic region and to the second geographic region. At least some of the sponsored content can be content sponsored by one or more vertical market service providers, at least one of the vertical market service providers providing service along the navigational route; and wherein identifying sponsored content that is responsive to the constructed search query can include identifying sponsored content for at least one of the vertical market service providers providing service along the navigational route.

In a third aspect, one or more non-transitory machine-readable storage media store instructions that are executable to perform operations including identifying a user search query that was submitted through a map interface and identifies a first geographic location, determining a first geographic identifier based on an abstraction of the first geographic location, determining, based on the first geographic identifier, a vertical market that provides services within an area corresponding to the first geographic identifier, determining search vertical keyword not included in the user search query that identifies the vertical market, constructing a constructed search query comprising at least the first geographic identifier and the search vertical keyword, identifying sponsored content that is responsive to the constructed search query, and providing, in response to the user search query, data that cause presentation of the identified sponsored content in the map interface.

Various implementations can include some, all, or none of the following features. The user search query can identifies a second geographic location, the user search query can be a request for a navigational route between the first geographic location and the second geographic location, the constructed search query can include a second geographic identifier determined based on an abstraction of the second geographic location, and the sponsored content can be responsive to the navigational route, and wherein the method further comprises determining the second geographic identifier based on the second geographic location. The first geographic identifier can identify a first geographic region and the first geographic location can be a geographic sub-region that includes less than the entire geographic region. The first geographic identifier can identify a city within which the first geographic location is located. The search vertical keyword that identifies the vertical market can be selected from the group that includes transportation, travel planning, and lodging. At least some of the sponsored content can be content sponsored by one or more vertical market service providers, at least one of the vertical market service providers providing service to a first geographic region identified by the first geographic identifier and a second geographic region identified by the second geographic identifier; and wherein identifying sponsored content that is responsive to the constructed search query includes identifying sponsored content for at least one of the vertical market service providers providing service to the first geographic region and to the second geographic region.

The systems and techniques described here may provide one or more of the following advantages. First, a system can identify an abstracted geographic region from a user-provided location, and identify vertical markets that applicable to a user's search for a location or a route. Second, the system can construct search queries that are relevant to the user's search, based on abstracted geographic regions and identified search vertical keywords not provided by the user. Third, the system can use constructed search queries to identify collections of sponsored content that are applicable to the user-provided location or locations. Fourth, the system can identify sponsored content that is applicable to a user's search for a route between two user-provided locations. Fifth, the system can identify sponsored content that is applicable to both endpoints of a route. Sixth, the system can identify sponsored content that is applicable to a route and a characteristic of the route.

The details of one or more implementations are set forth in the accompanying drawings and the description below. Other features and advantages will be apparent from the description and drawings, and from the claims.

DETAILED DESCRIPTION

This document describes systems, devices, methods, and techniques for responding to user queries in a map environment. In general, a user of a map advertising environment (e.g., a map application ("app") running on a mobile device) can submit search queries in order to find the locations of various places (e.g., businesses or attractions) or directions between places (e.g., navigation instructions), and additional content (e.g., advertisements) may be presented with the search results.

Some advertisements may be more relevant to some searches than others. For example, an advertisement for a taxi service in Boston may be more useful to a user who has searched for directions from a starting location within Boston to another location within Boston, but that same advertisement may less relevant to a user who has searched for directions from a starting location in Boston to a location in Orlando, FL (e.g., outside the taxi company's service area). On a similar note, the former search may be considered less relevant to advertisements for airlines or hotels (e.g., the trip is too short to need air travel or accommodations) than the latter search.

In general terms still, search queries may omit location-specific information that explicitly identifies the geographic area to be searched or the specific location that the user wishes to find. For example, a user may search for directions from "White House" to "Lincoln Memorial". Additionally, advertisements may be associated with geographic regions but not specific places within a region. For example, the taxi service of the example above may be associated with "Boston, MA", but not "Fenway Park" located within Boston. In such examples, search queries can be processed to identify a corresponding region that can then be used to identify relevant content such as advertisements. For example, a user can search for directions from "Logan International Airport" to "Fenway Park", and the search can be processed to determine that both Logan International and Fenway Park are both within the city of Boston, and provide the Boston taxi service ad in response even though neither of the specified locations include the location of Boston.

Figure 1:
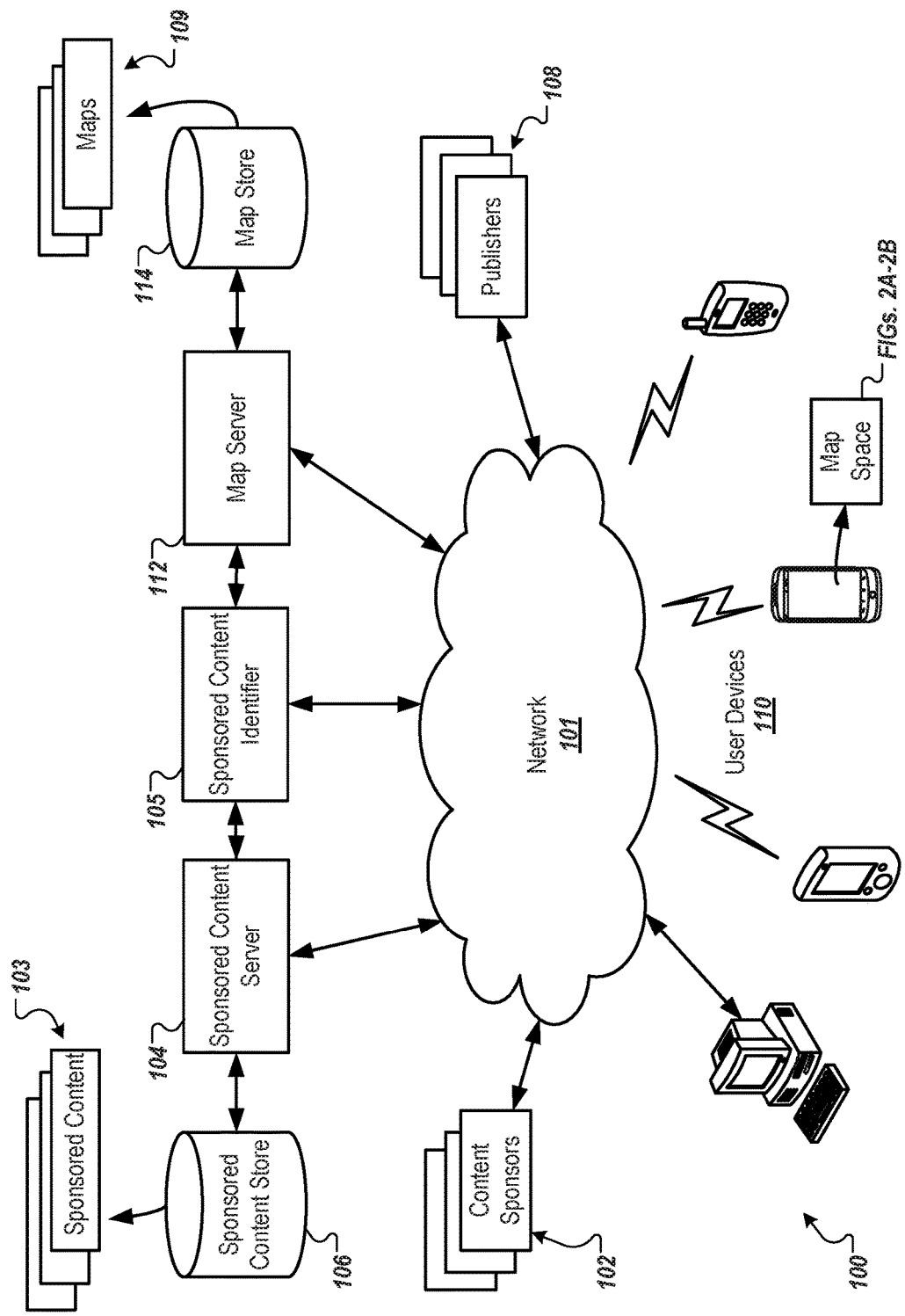
FIG. 1 is a block diagram of an example map environment.

FIG. 1 is a block diagram of an implementation of an example map environment 100. In some implementations, content sponsors 102 can connect to a sponsored content server 104 to upload sponsored content 103, view advertising performance statistics, bid for advertising space, or otherwise interact with the sponsored content server 104. The content sponsors 102 can connect to the sponsored content server 104 through the network 101. The network 101 can be a wide area network, local area network, the Internet, or any other public or private network, or combination of both. While reference is made to the sponsored content server 104, other content servers can be implemented in the environment 100.

The sponsored content 103 (e.g. content items) may be in the form of graphical advertisements (e.g., banner advertisements), text only advertisements, image advertisements, audio advertisements, video advertisements, advertisements combining one of more of any of such components, etc. The sponsored content may also include embedded information, such as links, meta-information, and/or machine executable instructions. The sponsored content 103 can be formatted, for example, for presentation in electronic maps ("maps" or "map spaces") 109. The sponsored content 103 can be stored in a sponsored content store 106 that is connected to the sponsored content server 104. While reference is made to sponsored content, environment 100 can deliver other forms of content items including other forms of sponsored content.

The sponsored content 103 may include information that identifies one or more vertical markets. For example, sponsored content for hotels and motels may identify a vertical market for "lodging" or "accommodations". In another example, sponsored content for taxis and limousines may identify a vertical market for "transportation". The sponsored content 103 may include information that identifies one or more geographic regions in which the products, goods, or services promoted by the sponsored content 103 is offered. For example, a Los Angeles area tour bus company may sponsor advertisements that identify the Los Angeles area. In another example, an airline may sponsor advertisements that identify the cities that have airports at which the airline provides service.

Publishers 108 can be network content providers that publish resources (e.g., websites). A resource is any data that can be provided over the network 101. A resource is identified by a resource address that is associated with the resource. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items or sponsored content.

A user device 110 is an electronic device that is capable of requesting and receiving resources over the network 101. Examples of the user device 110 include personal computers, mobile communication devices, and other devices that can send and receive data over the network 101. The user device 110 typically includes a user application, such as a web browser or a native map app, to facilitate the sending and receiving of data over the network 101.

The publishers 108 receive requests for content (e.g., a web page, map space, or another resource) from the user device 110 and present content in response to the requests. Publishers 108 may include one or more publisher. In response to requests, the publishers 108 can provide one or more maps 109 for presentation on the user device 110, thereby allowing the user device 110 access to maps 109 through the publisher's website.

In some implementations, the publishers 108 can include a map space with a web page (or another resource) by requesting the map 109 from the map server 112. In response to the map request by the publishers 108, the map server 112 selects data for the requested map 109 from the map store 114 for presentation. In some implementations, the request is a request for a map space (e.g., through a native map app). In response to the request for the map space, the map server 112 can provide the data for the requested map space 109 to the user device that initiated the map request.

The map request can also include or generate a request for sponsored content 103. A sponsored content identifier 105 communicates with the map server 112 and/or the sponsored content server 104 to identify sponsored content 103 promoting goods and services that are responsive to vertical markets within an identified geographic region. Examples of vertical markets can include transportation services (e.g., taxi services, limousine services, public transit, vehicle sharing, vehicle rentals, airlines, cruise ships, ferries, trains), hospitality services (e.g., hotels, motels, hostels, accommodation rentals, resorts, campgrounds), travel services (e.g., travel agents, translators, currency exchange, tour guides), or any other appropriate vertical market. It will be understood that certain content may relate to more than one vertical market, and that vertical markets may relate to more than one geographic area. It will also be understood that a request for sponsored content may relate to one or more verticals in related to one or more geographic areas.

For example, the map request may be for the location of the Golden Gate Bridge, and the sponsored content identifier 105 may communicate with the map server 112 (or a data store) to determine that the Golden Gate Bridge is in the city of San Francisco, CA. The sponsored content identifier 105 may then communicate with the sponsored content server 104 to identify sponsored content 103 provided by content sponsors 102, such as tour guides who serve the area of San Francisco.

In another example, the map request may be for directions from "Haight-Ashbury" to "Golden Gate Bridge", and the sponsored content identifier 105 may communicate with the map server 112 to determine that the request is for directions between two points that are both within the city of San Francisco, CA, and the map server 112 may provide information (e.g., navigational directions) for a path between the requested points. The sponsored content identifier 105 may then communicate with the sponsored content server 104 to identify sponsored content 103 that is responsive to the path, such as a taxi service that serves the requested route within San Francisco.

In some implementations, the map server 112 can request sponsored content 103 from the sponsored content identifier 105. In some implementations, code provided with the map space 109 includes code that causes the user device 110 to initiate a request for the sponsored content 103.

In some implementations, the request for a map 109 includes a request for sponsored content 103, and the sponsored content 103 are delivered to the map server 112 by the sponsored content identifier 105 and the sponsored content server 104. The map server 112 can integrate the sponsored content 103 into the map 109 by placing the sponsored content 103 on the map 109. The sponsored content 103 can be placed on the map 109 at a location representative of the location associated with the advertiser 102 (e.g., a map of the retail location of the advertiser). The sponsored content 103 can be placed on the map 109 by embedding the sponsored content 103 in the map 109, e.g., rendering the sponsored content 103 as part of the map 109.

Alternatively, the sponsored content 103 can be placed on the map by presenting the sponsored content 103 as overlays on the map 109. When the sponsored content is presented as overlays on the map 109, they are maintained in a separate file and do not become part of the map 109. Therefore, the characteristics of the sponsored content 103 are independent of the characteristics of the map 109, and a change affecting the display of the map 109 will not necessarily affect the display of the sponsored content 103. For example, if the map 109 is displayed at a higher zoom level, the sponsored content 103 will not necessarily be displayed at the higher zoom level.

In some embodiments, the map 109 can be provided as a web page. For example, the user device 110 can host a web browser that can be used to request, from the map server 112 or a general purpose web server in communication with the map server 112, a web page that includes the map 109. In some embodiments, the map 109 can be provided by a mapping software application ("app") running on the user device 110. For example, the user device 110 can be a smartphone that can download and execute a map app, and a user can interact with the map app to cause the map app to request map information from the map server 112. The map app can use the requested map information to generate and present the map 109 to the user.

The publishers 108 and/or map server 112 can also request that sponsored content 103 be included in the map 109. If the map request includes a request for sponsored content 103, the map server 112 sends a request to the sponsored content identifier 105 for sponsored content 103 associated with the map 109 for presentation in the map 109. The map 109 presented to the user device 110 will include the requested map and sponsored content 103 associated with the map 109, as illustrated in FIGS. 2A and 2B.

Figure 2B:
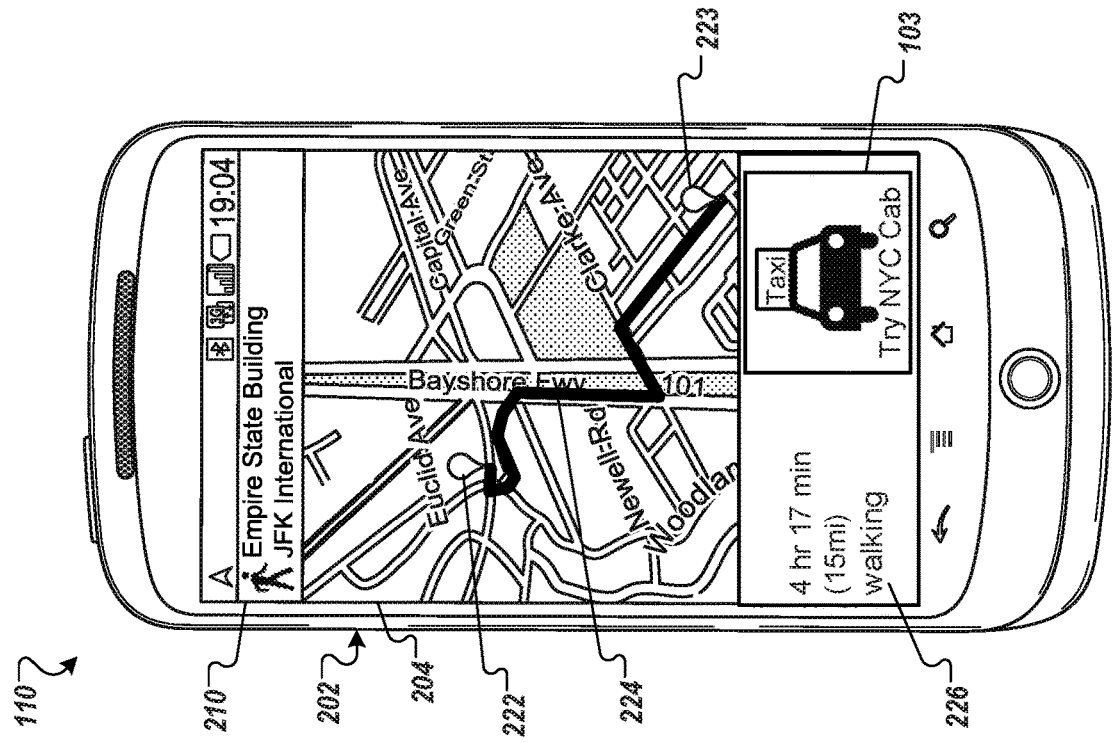
FIGS. 2A-2B are illustrations of example map spaces.
Figure 2A:
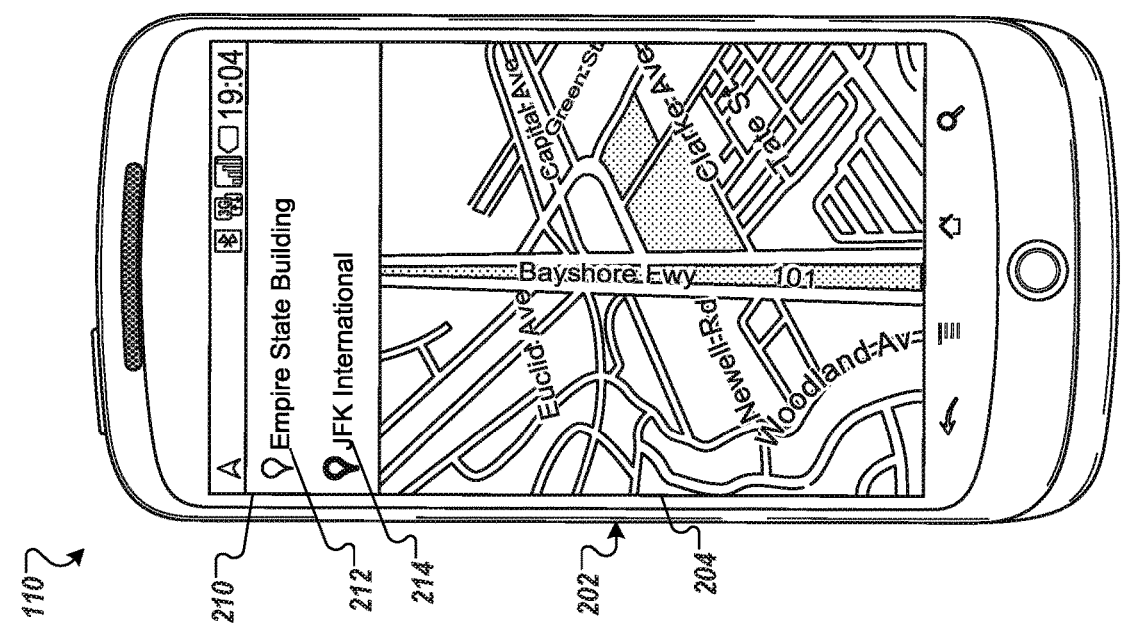

FIGS. 2A-2B are illustrations of example map spaces 202. The map space 202 is the portion of the map 109 selected by the map server 112 that can be displayed on the user device 110. In some implementations, the map space 202 is defined by a display region 204 and a zoom level. The display region 204 is the portion of the user's display that is allocated to present the map space 202. In some implementations, the map space 202 can be further defined by a central point. The central point can be the location of interest (e.g., city center, destination, store location) or any other point within the map space that serves as a reference point.

The display region 204 can vary according to a number of factors including display device limitations, user preferences, and publisher preferences, etc. In the example shown, the display region 204 is defined by the size and resolution of the display device. For example, a tablet computer with a 7 inch display and 1920×1200 resolution can display more of a map 109 than a handheld device having a 4 inch display and 1280×768 resolution. Accordingly, the map space 202 that is selected for presentation to different forms of the user device 110 will likely be different when the display region 204 and resolution of each user device 110 is different.

The user device 110 can interact with the map server 112 over the network 105 by using map websites and other map programs, such as a mapping "app". Utilizing these services the user device 110 can request maps 109 from the map server 112 through various query or browsing methods. For example, user device 110 can search for a navigational route between two particular addresses or businesses by directly entering the name of the businesses or addresses into a search interface 210.

Referring now to FIG. 2A, the user uses the search interface 210 to enter a route query. Route queries are user queries for route or navigational information between two locations. In the illustrated example, the user has entered a route query to request a route between an origin identifier 212 (e.g., the "Empire State Building") and a destination identifier 214 (e.g., "JFK International"). In some embodiments, the search interface 210 can be a text user interface, a speech recognition interface, a selectable list, or any other appropriate form of user interface that can be used to provide a search query.

The user device 110 and/or the map server 112 can process the user input to determine that it is a route query. For example, the origin identifier 212 and the destination identifier 214 in this example are proper place names (e.g., "Empire State Building" and "JFK International") are proper place (e.g., landmark) names that can be identified by the map server 112 and resolved to their equivalent geographical locations (e.g., the Empire State Building is located at 40.7484° N, 73.9857° W), or any other suitable geographic identifier. The user device 110 can interact with the map server 112, the advertising server 104, and/or the sponsored content identifier 105 to process the route query to provide information about the origin identifier 212 and/or the destination identifier 214 and sponsored content that may be of interest to the user based on the route query.

Referring now to FIG. 2B, the advertising server 104, the sponsored content identifier 105, and/or the map server 112 provide a collection of content that is responsive to the route query back to the user device 110 for presentation in the map space 202. In this scenario, the map space 202 presented in response to the search identifies an origin location 222, a destination location 223, and a path 224 of the route searched, and presents a summary 226 of the route. In addition to the summary 226, the map space 202 also presents one or more items of sponsored content 103 within the map space 202. The sponsored content 103 is content that promotes a vertical market that serves one or more areas identified by the user's query.

In some implementations, the user's query can be abstracted to identify locations associated with the origin identifier 212, the origin location 222, the destination identifier 214, the destination location 223, and/or the route 224. For example, the sponsored content identifier 105 can communicate with the map server 112 to determine that "JFK International" is in "New York City, NY". The sponsored content 103 can then communicate with the sponsored content server 104 to identify one or more vertical markets for the abstracted location.

In some implementations, the sponsored content identifier 105 can include a collection of search vertical keywords (e.g., "taxi", "tour guide", "hotel") that can be used to construct a constructed query that includes the abstracted location and the identified search vertical keyword (e.g., "taxi near Des Moines, IA"). The constructed search query can be provided to the sponsored content server 104 to identify sponsored content 103 that is responsive to the constructed query (e.g., sponsored content 103 can include information that identifies one or more vertical markets as well as the geographic regions served by the content sponsors 102 of the sponsored content 103).

In some implementations, the sponsored content identifier 105 can communicate with the sponsored content server 104 to determine one or more vertical markets that are served by the products, goods, and services offered in the abstracted location. For example, the sponsored content identifier 105 can provide the abstracted location "Des Moines. IA", and provide that abstracted location to the sponsored content server 104. The sponsored content server 104 can identify a subset of the sponsored content 103 that identifies "Des Moines" as a target market. From the subset, the sponsored content identifier 105 can identify one or more vertical markets identified by the subset of the sponsored content 103 in order to identify one or more search vertical keywords that can be used in a constructed query. For example, the sponsored content identifier 105 may determine that the sponsored content store 106 includes several items of sponsored content 103 for taxi services, but none for cruise ships, and identify "taxi" as a search vertical keyword that can be used in a constructed search query such as "taxi near Des Moines, IA".

Examples of vertical markets can include transportation services (e.g., taxi services, limousine services, public transit, vehicle sharing, vehicle rentals, airlines, cruise ships, ferries, trains), hospitality services (e.g., hotels, motels, hostels, accommodation rentals, resorts, campgrounds), travel services (e.g., travel agents, translators, currency exchange, tour guides), or any other appropriate vertical market that includes services that may be of use to a user who plans to travel the route 224.

In some implementations, the sponsored content 103 can be required to be responsive to both the origin location 222 and the destination location 223. For example, the sponsored content 130 can be for an airline that serves airports near both the origin location 222 and the destination location 223. In another example, the sponsored content 130 can be for a cruise ship line that serves ports near both the origin location 222 and the destination location 223.

In some implementations, the sponsored content 103 can be responsive to the route 224. For example, the sponsored content can be for a taxi, bus, or other transportation service that serves the route 224, or can be for a transportation service that provides an alternative route between the origin location 222 and the destination location 223 (e.g., a subway).

In some implementations, the sponsored content 103 can be responsive to either the origin location 222 or the destination location 223 and the route 224. For example, the map server 112 and/or the sponsored content server 104 can determine that the route 224 is long enough that advertisements for hotels or other forms of accommodations near the destination location 223 may be of interest to the user, whereas such advertisements may not be as relevant for shorter trips (e.g., a trip across town). In another example, the map server 112 and/or the sponsored content server 104 can determine that the route 224 may cause the user to be away from home (e.g., the origin location) for many hours, and respond by presenting advertisements for dog-walking, lawn care, or security patrol services that serve the origin location 222.

The sponsored content server 104 can identify sponsored content 103 that is responsive to the constructed query. For example, the sponsored content 103 for "NYC Cab" company can be identified in response to the constructed search query for "taxi near New York City, NY", and provide the sponsored content 103 for display in the map space 202.

In some implementations, the sponsored content server 104 requires that the constructed query (e.g., the abstracted geographic data that was not submitted with the search query and/or the vertical keyword that was not included in the search query) match one or more distribution terms that are used to distribute content items from a particular vertical in order for the sponsored content 103 from the particular vertical to be eligible for distribution in response to the search query. The match between the constructed query and the distribution terms can be required independent of any match between the submitted search query and the distribution terms.

The selection of a vertical that is responsive to the route 224, the origin location 222, or the destination location 223 can be based on vertical criteria that have been associated with each of the verticals. In some implementations, the vertical criteria for a particular vertical can specify one or more parameters that a map query must specify in order for sponsored content 103 in the particular vertical to be eligible for presentation with the map space 202 that is provided in response to the map request.

For example, the sponsored content server 104 may require that a route 224 corresponding to the map request be completely within a service area for taxis that service the location corresponding to the route 224. In a particular example, the sponsored content server 104 can require that the route 224 specify a travel distance that is further than a minimum distance (e.g., 0.2 miles or some specified other distance) and/or less than a maximum distance (e.g., 100 miles or some other specified distance) in order for sponsored content 103 from the taxi vertical to be eligible for distribution. Meanwhile, the sponsored content server 104 can require that the route 224 begin in one location that has an airport, and end in another location that has a different airport in order for sponsored content 103 for the airline vertical to be eligible for distribution.

In another example, the sponsored content server 104 can require that travel along the route 224 take more than a specified amount of time (e.g., 8 hours) in order for sponsored content 103 from the hotel vertical to be eligible for distribution with the map space 202. Similarly, the sponsored content server 104 can require that the time of day during which the route 224 is being traveled to be within a specified meal window (e.g., 11 am to 1 pm or 4 pm to 6 pm) in order for sponsored content 103 from a dining vertical to be eligible for distribution with the map space 202.

Figure 3:
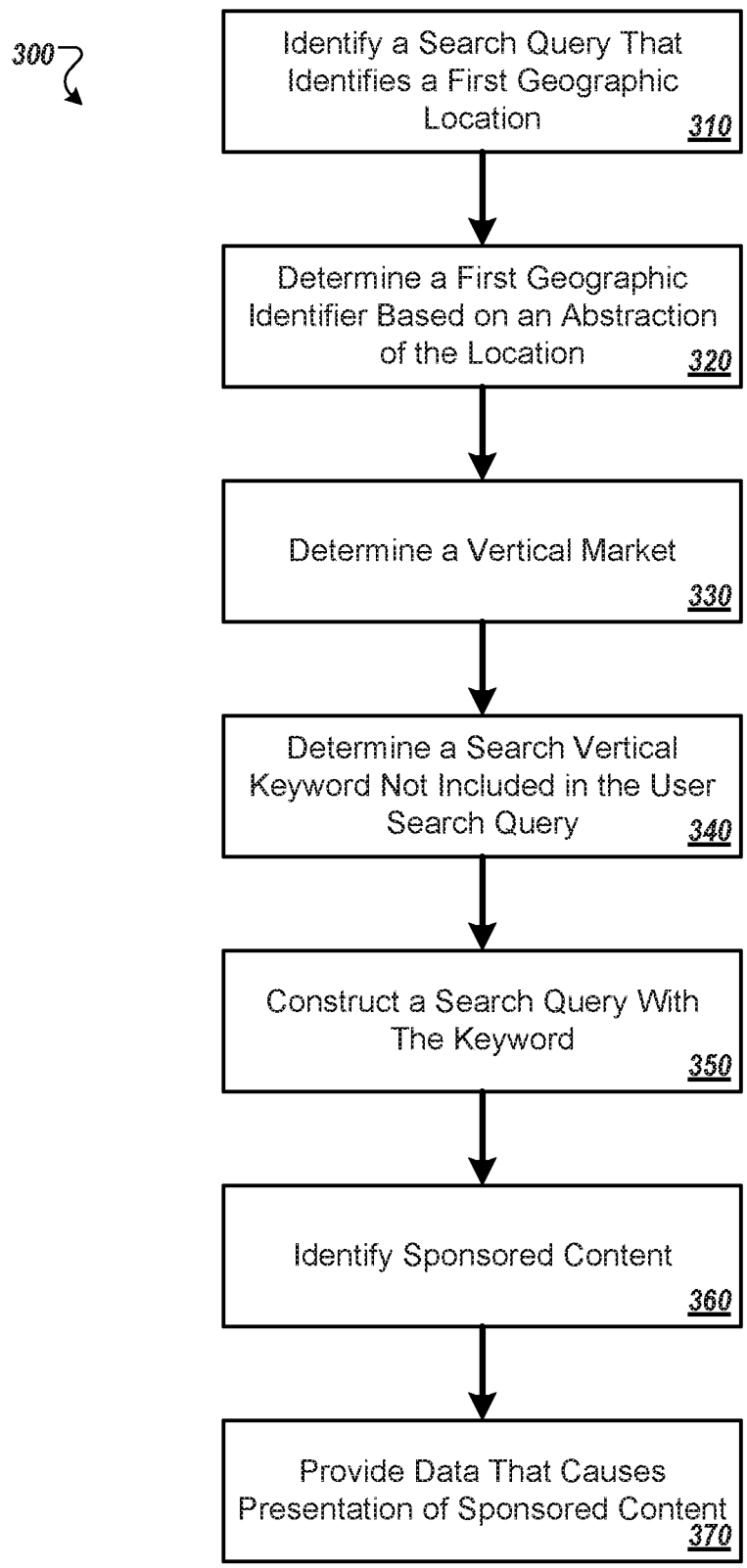
FIG. 3 is flow chart of an example process for responding to user queries in a map environment.

FIG. 3 is flow chart that shows an example of a process 300 for responding to user queries in a map environment. In some implementations, the process 300 may be performed in whole or part by one or more components of the system 100 of FIG. 1.

The process 300 begins at step 310 when a search query that was submitted through a map interface is identified. For example, a user can submit a search query through the query interface 210 of FIGS. 2A and 2B. In other examples, the search query can be identified 310 by the user device 110 or the map server 112 when the user highlights a character string or speaks a phrase as a user query. The search query identifies a first geographic location. In some implementations, the first geographic location can be any appropriate information that identifies a particular point or region on a map. For example, the first geographic location can be identified by a full address (e.g., 123 Main Street, Anytown, MN 55123), a partial address (e.g., 123 Main Street), a landmark name (e.g., Devil's Tower, Hoover Dam), GPS coordinates, a proper place name (e.g., Rockefeller Center, Regan International Airport), an intersection (e.g., 1st Avenue North and North 7th Street), a location indicated user interaction with a user interface (e.g., a touch or pin drop on a the map space 202), or any other appropriate form of information that can identify a location. In some implementations, the user search query can also identify a second geographic location, and a second geographic identifier that is not included in the query based on the second geographic location can be determined.

In some implementations, the geographic region can be an area that can include multiple geographic locations. For example, the geographic region can be a city, with which multiple discrete addresses or GPS coordinates can be associated. In another example, the geographic region can be a state, province, county, island, district, country, continent, or any other appropriate identifier for a geographic area.

In some implementations, the first geographic identifier can identify a first geographic region and the first geographic location can be a geographic sub-region that includes less than the entire geographic region. In some implementations, the first geographic identifier can identify a city within which the first geographic location is located. For example, "New Orleans, LA" can be a geographic region, and "French Quarter" can be a geographic location that is a sub-region within the city of New Orleans. It will be understood that multiple geographic locations need not be contiguous.

At step 320, a first geographic identifier that is not included in the user search query is identified based on an abstraction of the first geographic location. For example, the user may submit a landmark name or a proper place name (e.g., "White House"), and the map server 112 may determine that the user is searching for the residence located at 1600 Pennsylvania Ave NW, Washington, DC. In this example, "Washington, D.C." identifies an abstraction (e.g., the entire city) of the location of the White House.

In another example, the user may provide a partial address, such as "201 N Mill Street", and the and the map server 112 may determine that the user is searching for the "123 Main Street" that is nearest the user device 110 (e.g., based on GPS coordinates of the user device 110). In this example, the map server 112 may determine that the address that the user is searching for is in nearby "Brownsdale, MN", and provide that city name as an abstraction of the address being sought.

In yet another example, the user may submit GPS coordinates or interact with the map space 202 to identify an exact location rather than provide an address by name. In this example, the map server 112 may perform a reverse geocoding process in which the identified location is resolved to a nearby street address. For example, the user could submit the GPS coordinates "47.35169, –94.266413", and the map server 112 could resolve the location to "456 U.S. Highway 2, Bena, MN". The map server 112 may access a database that includes a hierarchical association of geographic locations (e.g., GPS_coordinates:mailing_address:city:county:state:country) and provide "Bena, MN" as an abstraction of the GPS coordinates provided by the user.

At step 330, a vertical market that provides services within an area corresponding to the first geographic identifier is determined based on the first geographic location. For example, the sponsored content 103 can include information that describes the geographic regions within which the products, goods, and services promoted by the sponsored content 103 are provided. For example, sponsored content 103 for a taxi service may identify "New York City" or "Des Moines", while sponsored content for hiking guides may identify "Yellowstone National Park" or "Grand Canyon". The map server 112, the sponsored content identifier 105, and/or the sponsored content server 104 can access the geographic information included with the sponsored content 103 to determine that the first geographic location could be served by businesses that provide transportation services (e.g., taxis, limousines), hospitality services, lodging services (e.g., hotels), travel planning services, communications services (e.g., cell phones, translators), or any other appropriate vertical market.

At step 340, a search vertical keyword not included in the user search query that identifies the vertical market is determined. For example, the sponsored content identifier 105 may be preconfigured with a collection of search vertical keywords. In another example, the sponsored content identifier 105 and/or the sponsored content server 104 can use the first geographic identifier to identify one or more search vertical keywords identified (e.g., listed in metadata) by sponsored content 103 that is associated with the first geographic identifier. For example, the sponsored content identifier 105 can determine, based on the first geographic identifier, that the first geographic location may be served by taxi services and identify the keyword "taxi", which was not provided by the user, as a search vertical keyword.

At step 350, a constructed search query comprising at least the first geographic identifier and the search vertical keyword is constructed. For example, the user may search for "Empire State Building", and the map server 112, the sponsored content server 105, and/or the sponsored content server 104 may determine that the searched location is in "New York City, NY" as well as determine "taxi" as a search vertical keyword that can be used in the construction of a search query such as "taxi near New York City, NY". In some implementations, one or more search vertical keywords and one or more geographic location may be used in the constructed search query. For example, the route 224 may be a route from a location in Minneapolis, MN to the neighboring city of St, Paul, MN. In such an example, a subset of vertical market services that serve routes between both cities can be identified, for example, by querying the sponsored content store 106 for a collection of search vertical keywords associated with sponsored content 103 that also identifies the start and destination cities as being included within their service areas. For example, the sponsored content identifier 105 may determine that the cities of Minneapolis and St. Paul are both served by content sponsors 102 that provide "taxi" and "limousine" services, but not "cruises" or "air travel". The sponsored content identifier 105 may use the identified one or more search vertical keywords to construct a search query for one or more geographic regions. For example, the sponsored content identifier 105 may construct a constructed search query such as "(taxi or limousine) near (Minneapolis and St. Paul)".

At step 360, sponsored content that is responsive to the constructed search query is identified. For example, the sponsored content server 104 can process the constructed search query "taxi near New York City, NY" to query the sponsored content store 106 to identify sponsored content 103 for taxi services that serve New York City. In the example of FIG. 2B, the sponsored content identifier 105, the sponsored content server 104, and/or the map server 112 have determined that the "NYC Cab Company" sponsors advertisements for an area that includes New York City, and have identified sponsored content 103 for the "NYC Cab Company" for presentation in the map space 202.

In some implementations, the constructed search query can also include a second geographic identifier, and the user search query can be a request for a navigational route between the first geographic location and the second geographic location, in which identifying sponsored can include identifying sponsored content that is responsive to the navigational route and the search vertical keyword. For example, the user may search for a route from MSP airport to O'Hare International Airport, and the map server 112 can abstract the user-provided locations to "Minneapolis, MN" and "Chicago, IL" respectively. The map server 112, the sponsored content identifier 105, and/or the sponsored content server 104 can construct a search query based on the abstracted locations and a search vertical keyword, such as "flights from Minneapolis, MN to Chicago, IL".

In some implementations, identifying sponsored content can include identifying content sponsored by one or more vertical market service providers, at least one of the vertical market service providers providing service to a first geographic region identified by the first geographic identifier and a second geographic region identified by the second geographic identifier. In some implementations, identifying sponsored content that is responsive to the constructed search query can include identifying sponsored content for at least one of the vertical market service providers providing service to the first geographic region and to the second geographic region. For example, for a route query between points in Miami, FL, and Cozumel, Mexico, travel service providers may be identified, and sponsored content for flights or cruises between those cities may be identified.

In some implementations, the search vertical market service provider may be identified based on a query of the sponsored content store 106 to identify a subset of sponsored content 103 that identifies both the first geographic identifier and the second geographic identifier. In turn, the subset can be processed to identify a collection of vertical markets identified by the subset. In some implementations, the search vertical service provider may be identified based on a preconfigured list of search vertical keywords. For example, the sponsored content store 106 may include sponsored content for providers of cruises and accounting services in both Miami and Cozumel. The search vertical keyword "cruise" may be part of a collection of pre-identified keywords that may be of interest to users who are performing route queries, whereas the search vertical keyword "accountant" may be omitted from such lists because such services may be of less interest to users who are performing route queries.

In some implementations, at least some of the sponsored content can be content sponsored by one or more vertical market service providers, at least one of the vertical market service providers providing service along the navigational route. In some implementations, identifying sponsored content that is responsive to the constructed search query can include identifying sponsored content for at least one of the vertical market service providers providing service along the navigational route. In the example of FIG. 2B, the sponsored content 103 for the "NYC Cab" company can be identified based on a determination by the sponsored content server 104 that the "NYC Cab" company provides taxi service to all points along the route 224. In some implementations, the sponsored content may provide one or more inputs that can be activated by the user to trigger an action, such as sending a message or initiating a telephone call. For example, the sponsored content 103 for the "NYC Cab" company, or a button or link provided with the sponsored content 103, may be selectable to summon a taxi to the user's location or to initiate a telephone call to the "NYC Cab" company (e.g., a "click-to-call" feature).

At step 370, data that causes presentation of the identified sponsored content in the map interface is provided in response to the user search query. For example, the sponsored content 103 can be provided to a user device for presentation in the map space 202 along with the route 224 and the summary 226. In some implementations, the data can include code that causes the user device to obtain the sponsored content from a network location specified in the code.

Figure 4:
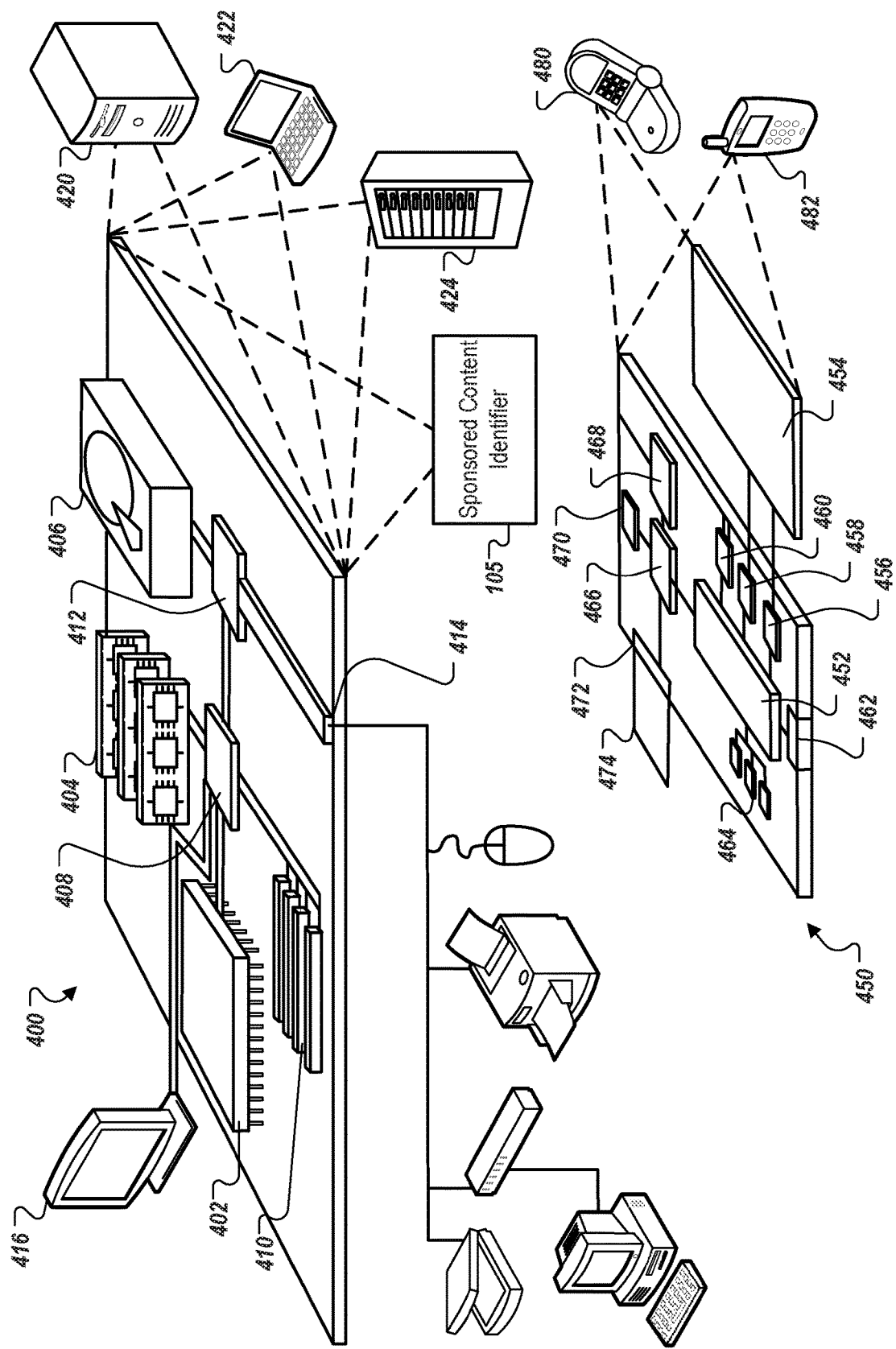
FIG. 4 is a block diagram of computing devices that may be used to implement the systems and methods of FIGS. 1-3.

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system). Multiple computing devices 400 may be located in one physical location or multiple locations, and may be interconnected using any suitable technique.

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. It may be implemented as the sponsored content identifier 105 of FIG. 1. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include one or more clients and one or more servers. Clients and servers are generally remote from one other and typically interact through a communication network. The relationship of client and server arises by virtue of computer programs running on the respective computers and having a client-server relationship to each other. Servers and groups of servers may be co-located or geographically distributed.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, from a user device, a user search query that references at least a first geographic location;
determining, based on the first geographic location referenced in the user search query, an abstracted geographic identifier that identifies a geographic region that encompasses the first geographic location and additional geographic locations, wherein the geographic region is not referenced in the user search query;
selecting, from a plurality of search verticals defined for the geographic region identified by the abstracted geographic identifier, a particular search vertical determined relevant to a topic of the user search query;
generating, by a first system, a constructed search query that includes at least (i) the abstracted geographic identifier that identifies the geographic region that encompasses the first geographic location referenced in the user search query and the additional geographic locations, and (ii) a search category keyword assigned to the particular search vertical, wherein the search category keyword was not included in the user search query and is separate from the abstracted geographic identifier;
identifying, by a second system and using the constructed search query, one or more content items that are determined relevant to the constructed search query; and
providing, to the user device and as a response to the user search query, overlay files for the one or more identified content items to cause the user device to present the one or more identified content items as overlays on a map, the overlay files maintained separately from files for the map so that the overlays can be rendered independently of the map.

2. The computer-implemented method of claim 1, wherein the first system comprises a sponsored content identifier server and the second system comprises a sponsored content server.

3. The computer-implemented method of claim 1, wherein the abstracted geographic identifier identifies a political region that encompasses the first geographic location referenced by the user search query and the additional locations.

4. The computer-implemented method of claim 1, wherein the particular search vertical is a transportation vertical, a travel vertical, or a lodging vertical.

5. The computer-implemented method of claim 1, wherein the user search query references the first geographic location with a name of the first geographic location, and generating the constructed search query comprises forming the constructed search query as a single textual string that includes the abstracted geographic identifier and the search category keyword.

6. The computer-implemented method of claim 1, wherein the user search query was submitted through a map interface at the user device, and the user search query is a route query that specifies an origin and a destination for a route.

7. A system comprising:
one or more processors; and
one or more computer-readable media having instructions stored thereon that, when executed by the one or more processors, cause the one or more processors to perform operations comprising:
receiving, from a user device, a user search query that references at least a first geographic location;
determining, based on the first geographic location referenced in the user search query, an abstracted geographic identifier that identifies a geographic region that encompasses the first geographic location and additional geographic locations, wherein the geographic region is not referenced in the user search query;
selecting, from a plurality of search verticals defined for the geographic region identified by the abstracted geographic identifier, a particular search vertical determined relevant to a topic of the user search query;
generating, by a first system, a constructed search query that includes at least (i) the abstracted geographic identifier that identifies the geographic region that encompasses the first geographic location referenced in the user search query and the additional geographic locations, and (ii) a search category keyword assigned to the particular search vertical, wherein the search category keyword was not included in the user search query and is separate from the abstracted geographic identifier;

identifying, by a second system and using the constructed search query, one or more content items that are determined relevant to the constructed search query; and providing, to the user device and as a response to the user search query, overlay files for the one or more identified content items to cause the user device to present the one or more identified content items as overlays on a map, the overlay files maintained separately from files for the map so that the overlays can be rendered independently of the map.

8. The system of claim 7, wherein the first system comprises a sponsored content identifier server and the second system comprises a sponsored content server.

9. The system of claim 7, wherein the abstracted geographic identifier identifies a political region that encompasses the first geographic location referenced by the user search query and the additional locations.

10. The system of claim 7, wherein the particular search vertical is a transportation vertical, a travel vertical, or a lodging vertical.

11. The system of claim 7, wherein the user search query references the first geographic location with a name of the first geographic location, and generating the constructed search query comprises forming the constructed search query as a single textual string that includes the abstracted geographic identifier and the search category keyword.

12. The system of claim 7, wherein the user search query was submitted through a map interface at the user device, and the user search query is a route query that specifies an origin and a destination for a route.

13. A non-transitory computer-readable medium having instructions stored thereon that, when executed by a processor, cause the processor to perform operations comprising:

receiving, from a user device, a user search query that references at least a first geographic location;

determining, based on the first geographic location referenced in the user search query, an abstracted geographic identifier that identifies a geographic region that encompasses the first geographic location and additional geographic locations, wherein the geographic region is not referenced in the user search query;

selecting, from a plurality of search verticals defined for the geographic region identified by the abstracted geographic identifier, a particular search vertical determined relevant to a topic of the user search query;

generating, by a first system, a constructed search query that includes at least (i) the abstracted geographic identifier that identifies the geographic region that encompasses the first geographic location referenced in the user search query and the additional geographic locations, and (ii) a search category keyword assigned to the particular search vertical, wherein the search category keyword was not included in the user search query and is separate from the abstracted geographic identifier;

identifying, by a second system and using the constructed search query, one or more content items that are determined relevant to the constructed search query; and providing, to the user device and as a response to the user search query, overlay files for the one or more identified content items to cause the user device to present the one or more identified content items as overlays on a map, the overlay files maintained separately from files for the map so that the overlays can be rendered independently of the map.

14. The computer-implemented method of claim 1, comprising comparing an attribute of the user search query to an eligibility criterion for category of content items to determine whether content items from the category of content items are eligible to be returned in response to the user search query.

15. The computer-implemented method of claim 14, wherein the attribute of the user search query comprises an attribute of a travel route determined from the user search query.

16. The computer-implemented method of claim 1, wherein identifying the one or more content items that are determined relevant to the constructed search query comprises searching a corpus of content items associated with the particular search vertical in the geographic region identified by the abstracted geographic identifier.

17. The computer-implemented method of claim 1, wherein the maintaining the overlay files separately from files for the map enables the user device to adjust one or more display characteristics of the one or more identified content items independently of the map.

18. The computer-implemented method of claim 17, wherein the one or more display characteristics comprises a zoom level of the one or more identified content items.

* * * * *